United States Patent

Lang et al.

[15] 3,640,826

[45] Feb. 8, 1972

[54] GRAFT COPOLYMERS OF ACRYLIC ACID AND POLYHYDROXY POLYMERIC COMPOUNDS FOR TREATING CLAYS

[72] Inventors: William J. Lang, Libertyville; John J. Krajewski, Wheeling, both of Ill.

[73] Assignee: International Minerals & Chemical Corporation

[22] Filed: Sept. 4, 1968

[21] Appl. No.: 757,399

[52] U.S. Cl. ................252/8.5 A, 252/8.5 C, 260/17 A, 260/17.4 GC
[51] Int. Cl. ...............C10m 3/22, C08b 21/24, C08f 29/100
[58] Field of Search ................252/8.5 A, 8.5 B, 8.5 C; 260/17.4, 17.4 GC

[56] References Cited

UNITED STATES PATENTS

| | | |
|---|---|---|
| 2,702,788 | 2/1955 | Dawson ................252/8.5 |
| 2,922,768 | 1/1960 | Mino et al. ................260/17.4 |
| 3,081,260 | 3/1963 | Park ................252/8.5 |
| 3,095,391 | 6/1963 | Brockway et al. ................260/17.4 |
| 3,216,934 | 11/1965 | Reinhard ................252/8.5 |
| 3,272,749 | 9/1966 | Martin ................252/8.5 |
| 3,323,603 | 6/1967 | Lummus et al. ................252/8.5 X |
| 3,377,302 | 4/1968 | Gugliemelli et al. ................260/17.4 |
| 3,472,325 | 10/1969 | Lummus ................252/8.5 X |

FOREIGN PATENTS OR APPLICATIONS

| | | |
|---|---|---|
| 1,029,100 | 3/1963 | Great Britain ................260/17.4 |

*Primary Examiner*—Herbert B. Guynn
*Attorney*—James E. Wolber and Peter Andress

[57] ABSTRACT

Water-soluble graft copolymers of acrylic acid with polyhydroxy polymeric compounds containing up to about 10.0 percent by weight, based on the weight of acrylic acid, of the polyhydroxy polymeric compound and water-soluble salts thereof are useful for treating clays, such as to render them especially useful in well drilling.

20 Claims, 1 Drawing Figure

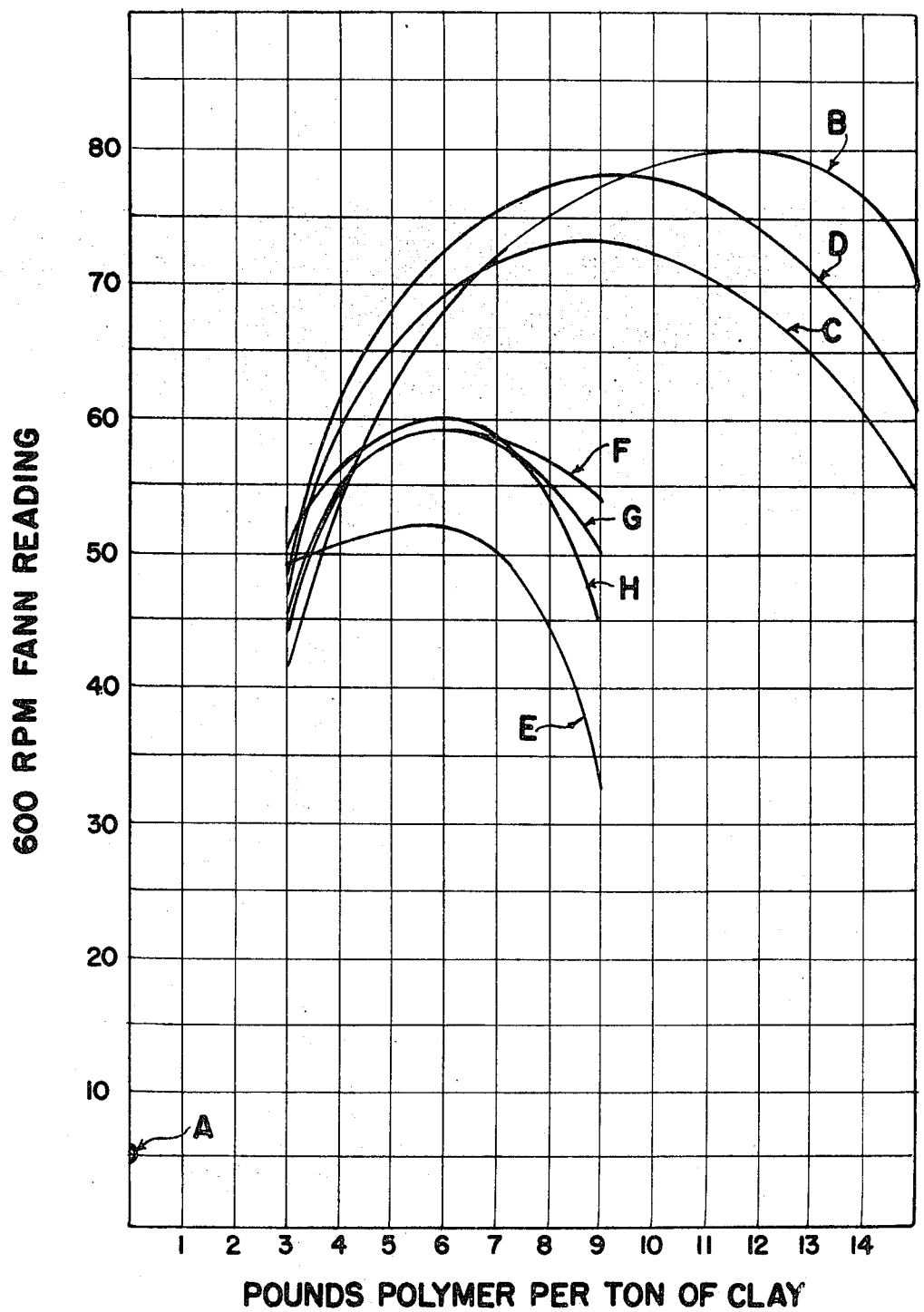

GRAFT COPOLYMERS OF ACRYLIC ACID AND POLYHYDROXY POLYMERIC COMPOUNDS FOR TREATING CLAYS

BACKGROUND OF THE INVENTION

This invention relates to the use of graft copolymers for beneficiating clay and to drilling muds containing graft copolymers. More specifically, this invention relates to the use of water-soluble graft copolymers of acrylic acid with a polyhydroxy polymeric compound and water-soluble salts of such graft copolymers for treating clays, such as to render them especially useful in well drilling.

The so-called "grafted" polymerizates are well known in the art. Various procedures have been devised for the production of these grafted polymers. These procedures entail either inducing side chain-forming monomers to polymerize in the presence of another, already preformed, polymer which serves as a principal chain and to which the polymerizing monomers attach themselves, or joining side chain macromolecules with another macromolecule which is separately produced and serves as a principal chain. The graft copolymers thus produced are different from other polymers by virtue of their special properties.

It is well known in the art to utilize graft polymerization techniques to modify properties of various materials, as for example, cellulose and cellulosic materials. For example, U.S. Pat. No. 2,922,768 of Mino and Kaizerman describes a process of preparing graft copolymers by polymerizing a polymerizable vinylindine monomer, such as acrylic or methacrylic acid, in an aqueous medium at a pH not greater than 3.5 and a polymeric organic reducing agent, such as cellulose or methyl cellulose, in the presence of a ceric salt. Faessinger and Conte disclose in U.S. Pat. No. 3,359,234 a process of producing graft copolymers which comprises reacting a water-insoluble cellulose or amylaceous monothiocarbonate or dithiocarbonate substrate by peroxide free radical initiation with acrylic acid or another ethylenically unsaturated monomer.

The prior art discloses a variety of polymers such as polyacrylate-type polymers as being useful for beneficiating clays by chemical treatment to render them especially useful for use in well drilling muds of widely varying compositions. Such drilling fluids are circulated in a well being drilled by the rotary process to provide lubrication during the drilling operation, to carry the cuttings to the surface, and for a number of other purposes.

Clays suitable for drilling fluids or muds are of two gneral types: Western or natural sodium bentonitic clays and native or subbentonitic clays. The yield value of a particular clay is the determining factor insofar as its use in the preparation of a drilling mud is concerned. The Western and subbentonitic clays exhibit different yield characteristics, apparently due to differences in their chemical compositions. Subbentonitic clays are generally calcium or magnesium varieties of montmorillonite and may contain substantial proportions of non-clay or nonmontmorillonite impurities. The Western bentonitic clays are natural sodium clays and are sometimes hereinafter referred to as merely "bentonitic" clays.

The yield of clay is defined as the number of barrels of an aqueous dispersion or mud having a viscosity of 15 centipoises which can be prepared from a ton of clay. Generally speaking, a yield of at least 90 barrels of 15 centipoises mud per ton of clay is the minimum standard for acceptable clays. A yield of this magnitude can be expected with the purer forms of natural sodium bentonite such as Wyoming bentonite but is not attained with less pure forms of bentonitic clays or with the calcium and other meta- and subbentonites. A yield of anywhere from about 40 to 100 barrels is obtainable with the bentonitic clays, while the subbentonitic clays produce only from about 25 to 60 barrels. Thus, while the bentonitic clays are preferred because of their generally superior yields, some of these even do not come up to the required standards. There is a need, therefore, for increasing the yields obtainable from both the low-yield bentonitic clays and the subbentonitic clays so as to increase their utility in mud making and to make them competitive with Wyoming bentonite.

There are also distinct advantages to be gained in further upgrading of sodium bentonite to produce the so-called "high yield" clays. Great economies can be effected, for example, if the yield can be doubled so that only half the amount of clay is required to prepare a given quantity of a high quality drilling fluid. A mud of low-solids content has the further advantage of giving faster drilling rates so as to appreciably lower the cost of drilling a well.

Attempts have been made to upgrade the low-yield clays, but such attempts have been generally unsuccessful. One method widely used has been to add to the clay a peptizing agent such as soda ash or sodium carbonate. This method of base exchanging the calcium ions with sodium ions has not always been successful by any means probably because the base exchange cannot be forced to completion in a practical manner and the slight improvement achieved is not economical. A number of polymers have been suggested for use in upgrading clays.

As illustrative of the types of polymers disclosed as being useful for treating clays for drilling muds, U.S. Pat. No. 3,216,934 of Reinhard relates to the use of a water-soluble interpolymer of maleic anhydride, an olefin having from two to four carbon atoms, and hexadiene-1,5. The patentee teaches that sodium carbonate or soda ash should be used with the polymer to treat subbentonitic types of clay. Use of an acrylate-acrylamide copolymer is described in U.S. Pat. No. 3,360,461 to Lummus and Anderson. Dawson, U.S. Pat. No. 2,702,788, relates to the use of the sodium salt of polyacrylic acid and soda ash for treating subbentonitic clays.

A polymer which is commercially sold for increasing the yield of bentonite to provide a low solids drilling fluid is a sodium polyacrylate sold under the name of Benex of Pan American Petroleum Corporation. Another polymer marketed under the name of M-7 is sold by Jorco Chemical Company, Inc. for treating bentonitic clays.

SUMMARY OF THE INVENTION

This invention is based on the discovery that novel water-soluble graft copolymers prepared by graft copolymerizing acrylic acid onto a minor amount of a substrate, which is a water-soluble polyhydroxyl-containing polymeric material, and water-soluble salts thereof are useful for beneficiating clays for use in well drilling fluids.

The graft copolymers are prepared by reacting acrylic acid with from about 0.1 to about 10 percent by weight, based on the weight of the acrylic acid, of a water-soluble polyhydroxy polymeric compound, e.g., carboxymethyl cellulose, in an aqueous medium at a pH not greater than about 3.5 by initiating the reaction with ultraviolet light or a peroxygen-type polymerization catalyst. The graft copolymer thus produced may be converted to the salt form by reaction with a suitable alkali metal hydroxide such as sodium hydroxide in an amount sufficient to neutralize the polymer. If desired, the aqueous medium containing the polymer, in either the acid form or the salt form, is heated in accordance with conventional techniques to yield a dry water-soluble polymer.

The graft copolymers thus produced are useful, in either the acid or salt form, in combination with clays to increase the yields of the clays so as to render them especially useful in drilling muds. The yield of clay is increased in accordance with this invention by combining with the clay a minor amount, e.g., from about 0.1 to about 20 pounds per ton of clay, of the graft copolymer in any desired manner. The drilling muds containing the graft copolymers in combination with clay are also less sensitive to high temperatures and salt contamination than drilling muds of substantially the same compositions without the graft copolymers. Still another advantage in the use of the graft copolymers is that they have a lower sensitivity with respect to amounts utilized than polymers of the prior art.

Therefore, in one aspect of this invention the yield of a bentonitic or subbentonitic clay is increased by intimately admixing with said clay, in an amount sufficient to increase the yield of said clay, at least one water-soluble graft copolymer of acrylic acid and a polyhydroxy polymeric compound, or a water-soluble salt of said graft copolymer.

Another aspect of this invention is a composition of matter consisting essentially of an intimate admixture of a bentonitic or subbentonitic clay and a minor amount of at least one water-soluble graft copolymer of acrylic acid and a polyhydroxy polymeric compound, or a water-soluble salt of said graft copolymer.

Still another aspect of this invention is a drilling fluid consisting essentially of water, a bentonitic or subbentonitic clay and at least one water-soluble graft copolymer of acrylic acid and a polyhydroxy polymeric compound, or a water-soluble salt of said graft copolymer, in an amount sufficient to increase the yield of said clay. The drilling fluid may also contain minor amounts of other materials which are normally added to drilling fluids, such as weighting agents.

A further aspect of this invention is a method of drilling a well comprising operating a power-driven cutting bit in the bottom of the well to drill the well deeper and thus produce bit cuttings and circulating a drilling fluid in the well to remove the bit cuttings from the well, wherein the drilling fluid consists essentially of water, a bentonitic or subbentonitic clay and at least one water-soluble graft copolymer of acrylic acid and a polyhydroxy polymeric compound, or a water-soluble salt of said graft copolymer, in an amount sufficient to increase the yield of said clay. The drilling fluid may also contain minor amounts of other materials which are normally added to drilling fluids, such as weighting agents.

DESCRIPTION OF THE PREFERRED EMBODIMENTS

The substrates which are coreacted with the acrylic acid to produce the graft copolymers which are useful in accordance with this invention are water-soluble polyhydroxyl-containing polymeric compounds other than methyl cellulose. In general, these polymeric compounds may be characterized as having a molecular weight greater than about 350 and containing at least about 5 percent free hydroxyl groups. The polymeric compounds may contain up to 30 percent and even higher free hydroxyl groups. It will be evident that the polyhydroxy polymeric compounds may contain substituents other than hydroxyl groups so long as the substituents are inert, i.e., nonreactive with the acrylic acid, under the reaction conditions. Examples of substituents other than mere hydroxyl groups which the polymeric compounds may contain are halo, alkyl, aryl, carboxyalkyl, hydroxyalkyl, halohydroxyalkyl, arylhydroxyalkyl, and the like.

The useful polymeric substrates include water-soluble polysaccharides and polyhydroxyl-containing derivatives thereof. Although disaccharides and trisaccharides may be used in accordance with this invention, the preferred polymeric compounds are the tetra-, penta- and higher polysaccharides and oligosaccharides, i.e., saccharides containing at least four linked monosaccharide molecules, and derivatives thereof containing substituents such as hereinbefore defined. The most preferred substrates include derivatives of cellulose and the biochemically synthesized heteropolysaccharides.

Some of the specific polymeric polyhydroxy compounds that may be used as substrates to prepare the novel copolymers of this invention include, but are not limited to water soluble derivatives of cellulose such as chlorohydroxypropyl cellulose, phenylhydroxyethyl cellulose, hydroxybutyl cellulose, hydroxyethyl cellulose, ethyl cellulose, hydroxyethyl methyl cellulose, hydroxypropyl methyl cellulose, carboxymethyl cellulose and the like cellulose ethers. Other polymeric compounds which may be coreacted with acrylic acid in accordance with this invention include starch and water-soluble derivatives of starch, e.g., chlorohydroxypropyl starch, phenylhydroxyethyl starch, hydroxybutyl starch, methyl starch, ethyl starch, hydroxyethyl starch, hydroxyethyl methyl starch, hydroxypropyl methyl starch, and carboxymethyl starch. Still other polymeric materials which may be used include the so-called "sugars" such as sucrose, maltose, lactose, raffinose, stachyose and vertascose; causticized lignite; biochemically synthesized heteropolysaccharides, e.g., produced by the action of bacteria of the genus *Xanthomonas* or the genus *Arthrobacter* on carbohydrates; polyvinyl alcohol; and polyalkylene glycols and derivatives thereof such as alkoxy polyalkylene glycols, e.g., polyethylene glycols and methoxy polyethylene glycols. It will be apparent to one skilled in the art that useful compounds include those compounds which will form the above-defined polymeric compounds in the acidic reaction medium and such compounds are included in the scope of this invention. For example, carboxymethyl cellulose will be formed from the sodium salt thereof in the acidic reaction medium.

The amount of the substrate reacted with acrylic acid in accordance with this invention may vary between about 0.1 and about 10.0 percent, preferably between about 0.25 and about 5.0 percent, based on the total weight of the acrylic acid used.

The graft copolymerization can be carried out by using well-known polymerization techniques. Ultraviolet light or any of the well-known peroxygen-type initiators, e.g., peroxide free radical initiators, may be used. The preferred peroxygen-type initiators are hydrogen peroxide and hydroperoxides such as t-butyl hydroperoxide, diisopropylbenzene hydroperoxide, cumene hydroperoxide, 1-phenylethyl hydroperoxide, and the like. Other useful peroxide initiators are diacyl peroxides such as benzoyl peroxide and acetyl peroxide, and dialkyl peroxides such as di-t-butyl peroxide and dicumyl peroxide. Still other useful peroxygen-type initiators include per-salts such as sodium, potassium or ammonium persulfate and sodium perborate; the peresters such as t-butyl peroxyacetate and t-butyl peroxybenzoate; and the peracids such as performic acid, peracetic acid, per-benzoic acid, and peroxylactic acid. If desired, Redox activated systems can be used in accordance with the usual polymerization practices. Thus, sodium bisulfite-potassium persulfate and hydrogen peroxide-ferrous ion systems may be employed. However, the incremental addition of the peroxygen-type initiator is preferred when a Redox activated system is utilized.

The quantity of the initiator employed can be varied depending on the reaction temperature and other conditions, but will ordinarily be from about 0.0005 to about 0.01 percent, preferably from about 0.002 to about 0.004 percent, based on the weight of the acrylic acid.

The temperature of the reaction is not critical and may vary between about −5° C. and about 100° C. The preferred temperature range is between about 40° C. and about 80° C., with a temperature between about 60° C. and about 70° C. being most preferred. The reaction may be carried out under superatmospheric pressure or even under partial vacuum. However, it is preferred to utilize atmospheric pressure for convenience since the reaction runs very favorably at this pressure. If desired, the reaction may be carried out under an inert atmosphere such as nitrogen or helium.

The graft copolymerization reaction of this invention is carried out in an acidic aqueous medium. The pH of the reaction medium may be any value up to and including about 3.5. It is preferred to maintain the pH between about 3.0 and about 3.5 for optimum results. In the event the amount of acrylic acid utilized is not sufficient to lower the pH of the reaction medium to a value of 3.5 or lower, the desired pH may be obtained by the addition of a suitable mineral acid such as sulfuric acid, nitric acid or hydrochloric acid.

The reactants and the initiator are combined in the aqueous reaction medium in any conventional manner. However, the initiator should not be added to the reaction medium containing only the acrylic acid since this could cause the polymerization of the acrylic acid in the absence of the polyhydroxy polymeric substrate. As illustrative of a suitable manner of combining the reactants, the acrylic acid and the polymeric

| | | 15 | 71 |
|---|---|---|---|
| C | XC-Polymer | 3 | 47 |
| | | 6 | 69 |
| | | 9 | 73 |
| | | 12 | 68 |
| | | 15 | 55 |
| D | XB-23 | 3 | 48 |
| | | 6 | 70 |
| | | 9 | 78 |
| | | 12 | 74 |
| | | 15 | 61 |
| E | Causticized | 3 | 49 |
| | Lignite | 6 | 52 |
| | | 9 | 33 |
| F | Sucrose | 3 | 44 |
| | | 6 | 59 |
| | | 9 | 54 |
| G | Starch | 3 | 46 |
| | | 6 | 59 |
| | | 9 | 50 |
| H | Polyvinyl | 3 | 50 |
| | Alcohol | 6 | 60 |
| | | 9 | 44 |

The results of these tests will clearly demonstrate to one skilled in the art that the copolymers of this invention are effective in treating clay to obtain a clay of increased yield. In addition, the broad peaks of the curves are indicative of the low sensitivity of the graft copolymers with respect to amounts utilized as compared to polymers of the prior art which would give curves of substantially narrower peaks in similar tests.

Although this invention has been described in relation to specific embodiments, it will be apparent that obvious modifications may be made by one skilled in the art without departing from the intended scope of the invention as defined in the appended claims.

We claim:
1. As a composition of matter, an intimate admixture of a bentonitic or subbentonitic clay and a minor amount of at least one water-soluble graft copolymer of acrylic acid and from about 0.1 to about 10 percent by weight, based on the weight of said acrylic acid, of a polyhydroxy polymeric compound, or a water-soluble salt of said graft copolymer, said polyhydroxy polymeric compound having a molecular weight greater than about 350 and being of the group consisting of:
   a. derivatives of cellulose of the group consisting of chlorohydroxypropyl cellulose, phenylhydroxyethyl cellulose, hydroxybutyl cellulose, hydroxyethyl cellulose, ethyl cellulose, hydroxyethyl methyl cellulose, hydroxypropyl methyl cellulose, and carboxymethyl cellulose, and
   b. biochemically synthesized heteropolysaccharides.
2. A composition of matter in accordance with claim 1 wherein the amount of said graft copolymer or salt thereof is from about 0.1 to about 20 pounds per ton of said clay, and said graft copolymer is an ultraviolet light or peroxygen-type compound induced graft copolymerization product.
3. A composition of matter in accordance with claim 2 wherein said graft copolymer is a peroxide free radical induced graft copolymerization product.
4. A composition of matter in accordance with claim 3 wherein the amount of said graft copolymer is from about 1 to about 15 pounds per ton of said clay.
5. A composition of matter in accordance with claim 4 wherein said clay is a bentonitic clay.
6. A composition of matter in accordance with claim 4 wherein said clay is a subbentonitic clay treated with from about 0.5 to about 7 percent by weight, based on the weight of said clay, of soda ash.
7. A composition of matter in accordance with claim 4 wherein said clay is a subbentonitic clay treated with from about 2 to 4 percent by weight, based on the weight of said clay, of soda ash.
8. A composition of matter in accordance with claim 4 containing a graft copolymer of acrylic acid and from about 0.25 to about 5 percent by weight, based on the weight of said acrylic acid, of said polyhydroxy polymeric compound, and said polyhydroxy polymeric compound is carboxymethl cellulose.

9. A composition of matter in accordance with claim 4 containing an alkali metal or ammonium salt of a graft-copolymer of acrylic acid and from about 0.25 to about 5 percent by weight, based on the weight of said acrylic acid, of said polyhydroxy polymeric compound, and said polyhydroxy polymeric compound is carboxymethyl cellulose.
10. A drilling fluid consisting essentially of water, a bentonitic or subbentonitic clay, and at least one water-soluble graft copolymer of acrylic acid and from about 0.1 to about 10 percent by weight, based on the weight of said acrylic acid, of a polyhydroxy polymeric compound, or a water soluble salt of said graft copolymer, said graft copolymer or salt thereof being present in an amount sufficient to increase the yield of said clay, said polyhydroxy polymeric compound having a molecular weight greater than about 350 and being of the group consisting of:
   a. derivatives of cellulose of the group consisting of chlorohydroxypropyl cellulose, phenylhydroxyethyl cellulose, hydroxybutyl cellulose, hydroxyethyl cellulose, ethyl cellulose, hydroxyethyl methyl cellulose, hydroxypropyl methyl cellulose, and carboxymethyl cellulose, and
   b. biochemically synthesized heteropolysaccharides.
11. A drilling fluid in accordance with claim 10 wherein the amount of said graft copolymer or salt thereof is from about 0.1 to about 20 pounds per ton of said clay, and said graft copolymer is an ultraviolet light or peroxygen-type compound induced graft copolymerization product.
12. A drilling fluid in accordance with claim 11 wherein said graft copolymer is a peroxide free radical induced graft copolymerization product of acrylic acid and a derivative of cellulose.
13. A drilling fluid in accordance with claim 12 wherein said clay is a bentonitic clay and the amount of said graft copolymer or salt thereof is from about 1 to about 15 pounds per ton of said clay.
14. A drilling fluid in accordance with claim 12 wherein said clay is a subbentonitic clay treated with from about 0.5 to about 7 percent by weight, based on the weight of said clay, of soda ash, and the amount of said graft copolymer or salt thereof is from about 1 to about 15 pounds per ton of said clay.
15. A drilling fluid in accordance with claim 12 containing a graft copolymer of acrylic acid and from about 0.25 to about 5 percent by weight, based on the weight of said acrylic acid, of said polyhydroxy polymeric compound.
16. A drilling fluid in accordance with claim 12 containing an alkali metal or ammonium salt of a graft copolymer of acrylic acid and from about 0.25 to about 5 percent by weight, based on the weight of said acrylic acid, of said polyhydroxy polymeric compound.
17. In a method of drilling a well by operating a power-driven cutting bit in the bottom of the well to drill the well deeper and thus produce bit cuttings, and circulating a drilling fluid in the well to remove the bit cuttings from the well, the improvement which comprises circulating in said well the drilling fluid of claim 10.
18. A method of drilling a well in accordance with claim 17 wherein the amount of said graft copolymer or salt thereof is from about 0.1 to about 20 pounds per ton of said clay, and said graft copolymer is a peroxide free radical induced graft copolymerization product of acrylic acid and a derivative of cellulose.
19. A method of drilling a well in accordance with claim 18 wherein said drilling fluid contains from about 1 to about 15 pounds per ton of said clay of a graft copolymer of acrylic acid and from about 0.25 to about 5 percent by weight, based on the weight of said acrylic acid, of said polyhydroxy polymeric compound, or an alkali metal or ammonium salt of said graft copolymer, and said clay is a bentonitic clay.
20. A method of drilling a well in accordance with claim 18 wherein said drilling fluid contains from about 1 to about 15 pounds per ton of said clay of a graft copolymer of acrylic acid and from about 0.25 to about 5 percent by weight, based on compound are each dissolved in separate amounts of water so as to provide homogeneous solutions thereof. These solutions are mixed and the initiator is then added to the mixed solution. Alternatively, the polymeric substrate material may be dissolved in water to provide a homogeneous solution to which the acrylic acid and the initiator are added. Other methods of combining the reactants and initiator will be obvious to one skilled in the art. Optimum results will be obtained if the polymeric substrate is thoroughly dissolved in at least a part of the aqueous reaction medium before it is combined with the acrylic acid. Stirring or shaking of the reaction mixture will facilitate the polymerization and result in more uniform polymers.

The reaction time will vary according to the reaction temperature and/or quantity of the initiator present. In general, the time should be sufficient to consume at least 95 percent of the acrylic acid. To illustrate the variance of the reaction time at different temperatures, polymerization was evident in about 5 to 7 hours when acrylic acid was reacted at 60° C. with about 1.0 percent by weight of the carboxymethyl cellulose, based on the weight of the acrylic acid, and 0.002 percent by weight of hydrogen peroxide, based on the weight of acrylic acid, was present. On the other hand, polymerization was complete in about 15 to 20 minutes when the reaction was carried out at 100° C. using the same relative amounts of the reactants and the initiator. Polymerization may be detected by a change in refractive index, and completion of the reaction may be detected by the absence of the distinctive odor of acrylic acid.

At the completion of the polymerization reaction, the copolymer thus produced may be converted to the salt form. This conversion is generally effected by neutralization with an appropriate hydroxide. Ammonium or alkali metal salts of the copolymers such as sodium, potassium and lithium salts may be obtained by reacting the copolymers with the corresponding hydroxide. Where complete neutralization is desired, a stoichiometric amount, and preferably a slight excess, of the hydroxide is used. Partial salts may, of course, be produced by using less than the quantity of alkali metal or ammonium hydroxide to effect complete conversion of the carboxyl groups.

The copolymers, in either of the acid form or the salt form, may be converted to a dry form if so desired. This may be accomplished by conventional techniques, such as by heating the aqueous solution of the copolymer in a drum drier at a temperature of about 105° C. to drive off the water and yield a dry polymer.

The graft copolymers, in either the acid form or salt form (e.g., ammonium and alkali metal salts), are useful for treating bentonitic and subbentonitic clays to render them especially useful in drilling muds. The copolymer is combined with the clay in any desired manner. For example, a simple mechanical mixture of the clay and copolymer is prepared by dry-blending the copolymer in powder form directly with dry clay. This can be done conveniently at the time the clay is ground, as for example, in a roller mill. Alternatively, an aqueous solution of the copolymer may be sprayed directly onto the clay either in stock piles, after crushing, during a grinding operation, or during a bag-packing operation. Also, if desired, the clay and copolymer can be separately added in any desired order to form a slurry. This type of wet mixing could be employed, as for example, at the well site.

The clay is treated with an amount of the copolymer which is sufficient to increase the yield of the clay. The amount of the copolymer needed depends to some extent on the degree of beneficiation desired and varies with the clay, but generally only small quantities are required. Amounts within the range of from about 0.1 to about 20 pounds per ton of clay will produce satisfactory results. The preferred quantities for treatment are from about 1 to about 15 pounds of polymer per ton of clay.

When the clay to be treated is a subbentonitic or calcium montmorillonite type of clay, the graft copolymers of this invention are employed for best results together with an alkali metal compound which is water-soluble, ionizable, and has an ion capable of reacting with calcium to form a water-insoluble precipitate. Such compounds include, as for example, alkali metal carbonates, hypophosphates, oxalates, phosphates, silicates, sulfites and tartrates. Sodium carbonate or soda ash is particularly preferred. The amount of the alkali metal compound employed will be somewhat dependent upon the proportion of calcium montmorillonite in the whole clay. In general, amounts from about 0.5 percent to about 7 percent by weight of the clay can be used with increasing amounts giving higher degrees of beneficiation. However, it is preferred to employ amounts slightly less than 7 percent since quantities in excess of this amount can act to reduce the yield of the clay. With soda ash, for example, preferred amounts are from about 2 percent to about 4 percent by weight, with optimum results being obtained with about 3 percent by weight.

It will be evident to those skilled in the art that the drilling muds containing the copolymers in combination with the clay may also contain materials in addition to the clay, copolymer and water. For example, the drilling muds may also contain weighting agents such as barite, oil, treating chemicals such as caustic, surface active agents, and other materials commonly found in or added to drilling muds.

The following nonlimiting example will further illustrate the present invention.

Graft copolymers were prepared utilizing several different types of water-soluble polyhydroxy polymeric compounds as substrates. The polymeric compounds used in these experiments were carboxymethyl cellulose, a heteropolysaccharide produced by the action of *Xanthomonas campestris* on carbohydrates and sold under the name of XC-Polymer, another bacterially produced polymer obtained from General Mills Corporation under the name XB-23, causticized lignite, sucrose, starch, and polyvinyl alcohol.

In each experiment, a solution of 0.1 gram of the respective polymeric compound in 84 milliliters of distilled water was prepared in a glass bottle. Glacial acrylic acid in the amount of 9.9 grams (9.35 milliliters) and finally 0.1 milliliter of a 30 percent hydrogen peroxide solution were then added to the solution while it was being stirred. The jars were flushed with nitrogen, sealed and then maintained at 40° C. for 24 hours with periodic agitation to allow the copolymerization to take place. At the end of the 24-hour period the graft copolymers in each of the jars were treated with 8 milliliters of a 50 percent aqueous sodium hydroxide solution to convert the copolymers to the sodium salt form.

A series of experiments were then conducted to demonstrate the effectiveness of the polymers prepared as outlined above in rendering clays more useful in drilling muds, that is, to increase the yields of the clays. In these experiments, a clay-water slurry having a solids content of 10 pounds per barrel was prepared by adding a Western bentonite to deionized and distilled water. The slurry was covered and allowed to stand for a period of about 24 hours. At the end of this static aging period, varying amounts of a 10 percent solution of a polymer prepared as outlined above were added to different samples of the slurry to represent treatment levels ranging from 3 to 15 pounds per ton. The slurries were mixed. Immediately after mixing the viscosities of each of the slurries were determined with a Fann viscosimeter at 600 r.p.m. and recorded. The results of these test showing the effectiveness of the graft copolymers of this invention for treating clays are presented in the following table. The data of the table were plotted and the curves obtained are shown in the drawing accompanying this application.

| Drawing Curve | Substrate | Amount of Polymer, lbs./ton | Viscosity, 600 r.p.m. Fann Reading |
|---|---|---|---|
| A | - | - | 5 |
| B | Carboxymethyl Cellulose | 3 | 41 |
|  |  | 6 | 68 |
|  |  | 9 | 77 |
|  |  | 12 | 80 | the weight of said acrylic acid, of said polyhydroxy polymeric compound, or an alkali metal or ammonium salt of said graft copolymer, and said clay is a subbentonitic clay treated with from about 0.5 to about 7 percent by weight, based on the weight of said clay, of soda ash.

* * * * *